(12) United States Patent
Hayashi et al.

(10) Patent No.: US 9,727,189 B2
(45) Date of Patent: Aug. 8, 2017

(54) TOUCH PANEL STRUCTURE, METHOD FOR MANUFACTURING TOUCH PANEL STRUCTURE AND METHOD FOR MANUFACTURING DISPLAY APPARATUS

(71) Applicant: Mitsubishi Electric Corporation, Tokyo (JP)

(72) Inventors: Masami Hayashi, Kumamoto (JP); Masaru Aoki, Kumamoto (JP); Toru Takeguchi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/741,543

(22) Filed: Jun. 17, 2015

(65) Prior Publication Data
US 2015/0378475 A1 Dec. 31, 2015

(30) Foreign Application Priority Data

Jun. 26, 2014 (JP) ................................ 2014-130972

(51) Int. Cl.
G06F 3/045 (2006.01)
H01B 13/00 (2006.01)
G06F 3/044 (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .................. G06F 3/044; G06F 1/1338; G06F 2203/04103; G05F 2203/04103
USPC ................................................ 345/173–174
See application file for complete search history.

(56) References Cited

U.S. PATENT DOCUMENTS

| 8,709,265 B2 | 4/2014 | Misaki | |
| 2009/0096759 A1* | 4/2009 | Nishiwaki | G06F 3/041 345/173 |
| 2010/0164896 A1* | 7/2010 | Nakayama | G06F 3/044 345/173 |
| 2012/0206395 A1 | 8/2012 | Misaki | |
| 2012/0268670 A1* | 10/2012 | Yamazaki | G02F 1/13454 349/12 |

(Continued)

FOREIGN PATENT DOCUMENTS

| JP | 2013-222123 A | 10/2013 |
| WO | 2011/052392 A1 | 5/2011 |
| WO | 2011/065292 A1 | 6/2011 |

*Primary Examiner* — Kwin Xie
(74) *Attorney, Agent, or Firm* — Studebaker & Brackett PC

(57) ABSTRACT

In a lead-out wiring area, a protective conductive film is formed on a bottom surface and a side surface of a first contact hole including a surface of a first low resistance conductive film, and a part of a surface of an upper interlayer insulating film, and a second protective conductive film is formed on a bottom surface and a side surface of a second contact hole including a surface of a second low resistance conductive film, and a part of the surface of the upper interlayer insulating film. Then, a lower layer terminal part for a lower layer wiring line is formed of a laminated structure of the first low resistance conductive film and the first protective conductive film, and an upper layer terminal part for an upper layer wiring line is formed of a laminated structure of the second low resistance conductive film and the second protective conductive film.

13 Claims, 9 Drawing Sheets

(56) References Cited

U.S. PATENT DOCUMENTS

| | | | |
|---|---|---|---|
| 2012/0327020 A1* | 12/2012 | Kohara | G02F 1/13338 345/174 |
| 2013/0181727 A1* | 7/2013 | Nishizawa | G06F 3/044 324/658 |
| 2013/0278549 A1 | 10/2013 | Hayashi et al. | |
| 2017/0075461 A1 | 3/2017 | Orita et al. | |

* cited by examiner

F I G . 2 2
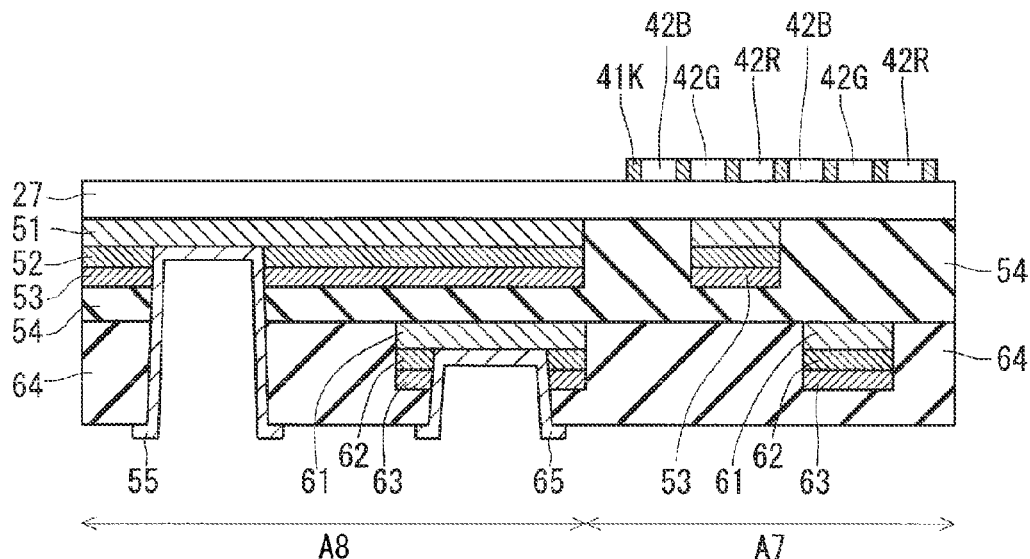
F I G . 2 3
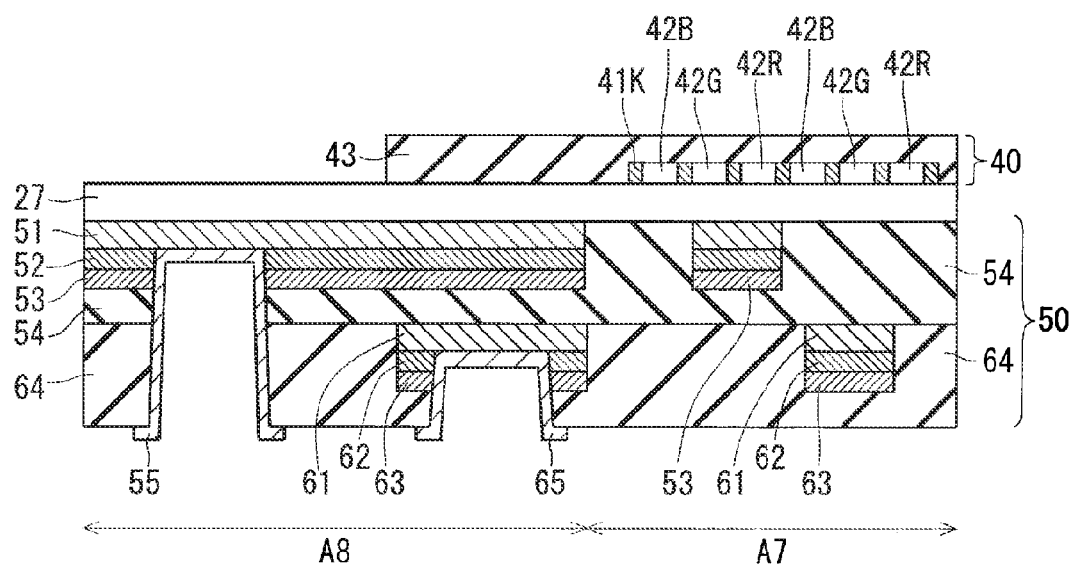

TOUCH PANEL STRUCTURE, METHOD FOR MANUFACTURING TOUCH PANEL STRUCTURE AND METHOD FOR MANUFACTURING DISPLAY APPARATUS

BACKGROUND OF THE INVENTION

Field of the Invention

The present invention relates to a touch panel structure including a color filter, a method for manufacturing the touch panel structure, and a method for manufacturing a display apparatus, and more particularly to a touch panel structure suitable for outdoor use.

Description of the Background Art

In display apparatuses including touch panels used outdoors, excellent display characteristics are demanded also in environments in which incident light amounts from outside the display apparatuses are high, such as use under sunlight. In other words, as a characteristic of touch panel wiring, low reflection to incident light from outside the display apparatus, and high transmission to light from a light source for display are demanded. On the other hand, electrically low resistance is also demanded because of responsiveness, sensitivity, or the like as a touch sensor required for a touch panel.

Furthermore, formation of a touch panel on a first main surface opposite to a color filter formed on a second main surface on the same substrate, namely, an on-cell touch panel is implemented, so that the module thickness of a whole apparatus can be reduced compared to a case where a touch panel substrate is separately provided. Therefore, a display apparatus using the on-cell touch panel is effective to function improvement by thickness reduction and weight reduction, and cost reduction by simplification of a structure.

Therefore, International Publication No. 2011/065292 discloses a touch panel structure, in which a touch panel is formed on a first main surface opposite to a color filter formed on a second main surface on the same substrate, a transparent conductive film having relatively high resistance compared to metal, but having low reflection to incident light from outside a display apparatus and high transmission to light from a light source for display is used as a wiring line in a display part, a metal material such as aluminum having lower resistance than the transparent conductive film is used as a lead-out wiring line or a connection terminal part for outputting an electrode potential of the touch panel to an external circuit board, and a method for manufacturing the same.

On the other hand, International Publication No. 2011/052392 describes a touch panel structure, in which a touch panel is formed on a first main surface opposite to a color filter formed on a second main surface on the same substrate, a metal film low in resistance is used as a wiring line, and which is disposed at an overlapping position in a display panel thickness in a portion other than an openings in a pixel part so as not to shield light form a light source for display, and a method for manufacturing the same.

Furthermore, Japanese Patent Application Laid-Open No. 2013-222123 describes a touch panel structure used in touch panel wiring having an antireflection function formed of an aluminum film, an aluminum nitride film (low reflection film), and a transparent film, as an example, for the purpose of disposing an antireflection film on an aluminum alloy wiring line, in order to reduce reflection of incident light from outside a display apparatus, and a method for manufacturing the same.

However, the touch panel structure disclosed in International Publication No. 2011/065292 is complicated, and has a problem that the transparent conductive film of the display part is still high in resistance, and particularly, excellent electrical characteristics are not obtained to increase in size (increase in size of a screen).

The touch panel structure disclosed in International Publication No. 2011/052392 has a problem that since placement of the touch panel wiring needs to match a light shielding layer of the color filter or the like, restriction on design is large.

On the other hand, in the touch panel structure disclosed in Japanese Patent Application Laid-Open No. 2013-222123, since the wiring line is low in resistance, a wiring line width can be designed thinner, a high opening ratio is attained and optical characteristics and electrical characteristics demanded for a touch panel, described before, are sufficiently satisfied.

However, in a case where the touch panel using the Al (aluminum) based low reflection wiring line is formed on the substrate as disclosed in Japanese Patent Application Laid-Open No. 2013-222123, when a case of performing a step of forming the color filter on a surface opposite to the substrate after that is assumed, there is a problem that a metal portion functioning as the connection terminal part provided in the opening of the touch panel wiring line is damaged by an alkaline developer used in a step of developing the color filter, and connection failure between the connection terminal part and the wiring line is generated.

On the contrary, when a case of first forming the color filter on the substrate, and thereafter performing a step of forming the touch panel structure disclosed in Japanese Patent Application Laid-Open No. 2013-222123 is assumed, the color filter is already formed on the lower surface of the substrate when the touch panel structure is formed, and therefore there is a problem that the color filter is damaged during stage absorption such as exposure or conveyance, which is performed in the step of forming the touch panel structure, and a yield is lowered.

SUMMARY OF THE INVENTION

An object of the present invention is to obtain a touch panel layer formed of a laminated wiring line having low resistance and low reflection without deteriorating performance, in a touch panel structure having a color filter layer.

A touch panel structure according to the present invention includes: a substrate having a first main surface and a second main surface; a touch panel layer formed on the first main surface of the substrate, and having a display area, and a lead-out wiring area where an external terminal part for external connection is provided; and a color filter layer formed on the second main surface of the substrate, wherein the color filter layer is formed to overlap with the display area of the touch panel layer in plan view.

The touch panel layer includes a laminated wiring line formed by laminating a lower conductive film, a low reflection film, and a transparent film, in this order. The touch panel layer further includes: an interlayer insulating film formed to cover the laminated wiring line; an opening selectively formed in the lead-out wiring area, passing through the interlayer insulating film, the transparent film, and the low reflection film, and having a bottom surface that is an exposed surface of the lower conductive film; and a protective conductive film formed on the bottom surface including the lower conductive film and a side surface of the opening. The lower conductive film and the protective conductive film function as the external terminal part.

In the touch panel structure according to the present invention, the protective conductive film is formed on the bottom surface including the lower conductive film and the side surface of the opening of the touch panel layer, and therefore the lower conductive film and the low reflection film in the lead-out wiring area are not influenced when the color filter layer is manufactured after the formation of the touch panel layer. As a result, the lower conductive film can be formed by using a material such as aluminum having low resistance, and the low reflection film can be formed by using a material having low reflectance, and therefore it is possible to obtain a touch panel structure, in which the touch panel layer formed by the laminated wiring line having low resistance and low reflection is formed without degrading of performance.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 24 are sectional views each illustrating a method for manufacturing the touch panel substrate with a CF of the preferred embodiment.

DESCRIPTION OF THE PREFERRED EMBODIMENTS

Overall Configuration of Display Apparatus

Figure 1:
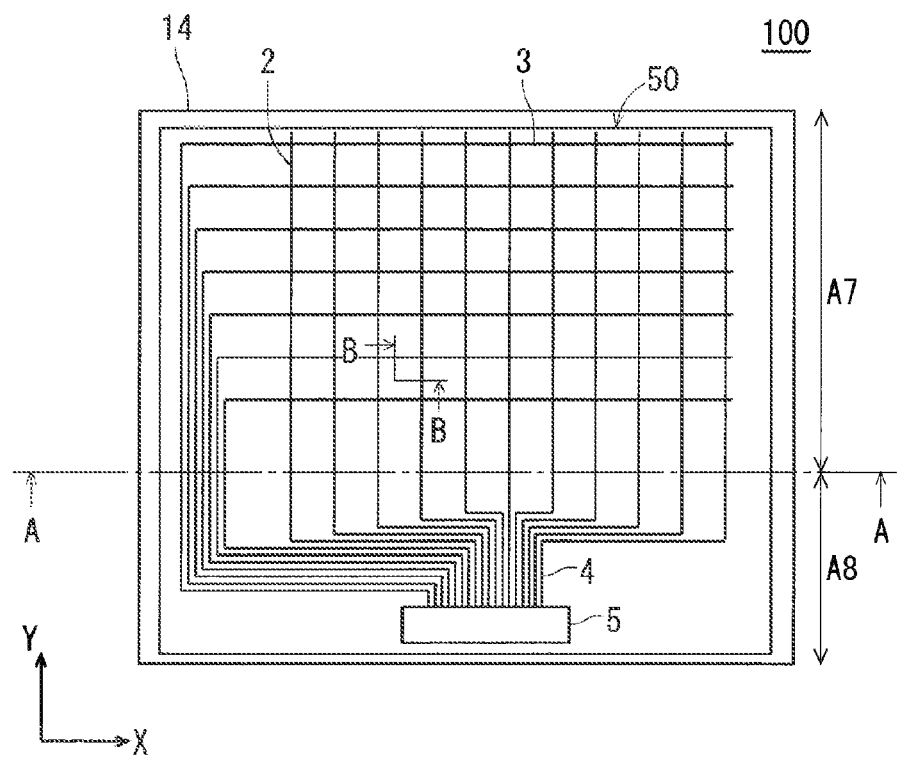
FIG. 1 is a plan view illustrating an overall configuration of a display apparatus of a preferred embodiment in the present invention.
Figure 2:
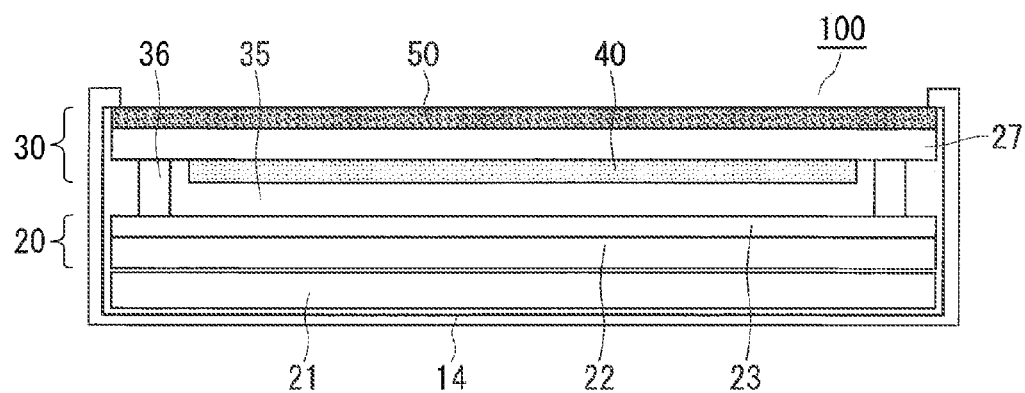
FIG. 2 is a sectional view illustrating the A-A cross-section in FIG. 1.

FIG. 1 is a plan view illustrating an overall configuration of a display apparatus of a preferred embodiment in the present invention, and FIG. 2 is a sectional view illustrating the A-A cross-section in FIG. 1. FIG. 1 illustrates an XY orthogonal coordinate system.

A display apparatus 100 illustrated in FIGS. 1 and 2 has a configuration enabling input by a touch panel subject to outdoor use, and has a pointing function by a finger, a hand, or the like.

As illustrated in FIG. 2, the display apparatus 100 is formed as a liquid crystal display panel, and is formed of a laminated structure of a backlight unit 21, a TFT substrate 20, a liquid crystal part 35, a seal material 36 for the liquid crystal part 35, and a touch panel substrate 30 with a CF (color filter), in a housing 14.

The TFT substrate 20 is formed of a laminated structure of a transparent substrate 22 and a TFT layer 23. On the other hand, the touch panel substrate 30 with a CF includes a transparent substrate 27 (substrate), a touch panel layer 50 formed on a first main surface (upper plane in the drawing) of the transparent substrate 27, and a color filter layer 40 formed on a second main surface (lower plane in the drawing) of the transparent substrate 27. The touch panel substrate 30 with a CF having such a configuration is combined with a display module (such as the liquid crystal part 35 and the TFT substrate 20) forming a GUI (graphical user interface) apparatus, so that a pointing function can be imparted to the display apparatus 100.

The touch panel layer 50 is a projection capacitance type touch panel, is formed on the transparent substrate 27 formed of glass, PET (polyethylene terephthalate), or the like, and has wiring lines 2 for X position detection and wiring lines 3 for Y position detection. The wiring lines 2 for X position detection are arranged to extend in a column direction (Y direction (first direction) in FIG. 1), and the wiring lines 3 for Y position detection are disposed above the wiring lines 2 for X position detection, and arranged to extend in a row direction so as to three-dimensionally intersect with the wiring lines 2 for X position detection (X direction in FIG. 1 (second direction perpendicular to the first direction, and intersecting with the first direction in plan view)). The touch panel layer 50 has matrix wiring formed of these wiring lines 2 for X position detection and wiring lines 3 for Y position detection.

As illustrated in FIG. 1, the wiring lines 2 for X position detection and the wiring lines 3 for Y position detection are electrically connected to a (connection) terminal part 5 for external signal input/output provided at an edge (lower part in the drawing) of the touch panel substrate 30 with a CF, through lead-out wiring lines 4, and the touch panel substrate 30 with a CF is electrically connected to a control substrate (not shown) through a (connection) terminal part 5 for external connection.

In the following preferred embodiment, the wiring lines 2 for X position detection are defined as lower layer wiring lines (transparent substrate 27 side), the wiring lines 3 for Y position detection are defined as upper layer wiring lines (polarizing plate 66 side, described later), but the wiring lines 2 for X position detection and the wiring lines 3 for Y position detection may be disposed such that the upper and lower relation are reversed.

First Preferred Embodiment

Figure 3:
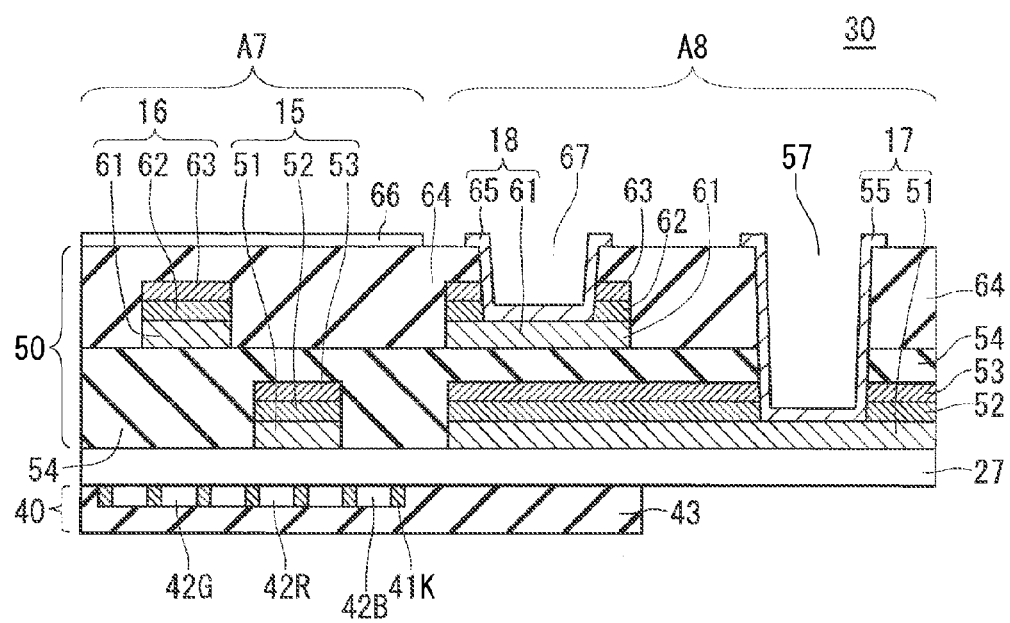
FIG. 3 is a sectional view illustrating the B-B cross-section illustrated in FIG. 1, and a sectional configuration of a lead-out wiring area of a wiring line for X position detection and a wiring line for Y position detection.

Hereinafter, the touch panel substrate 30 with a CF (touch panel structure) of the preferred embodiment according to the present invention is described with reference to a sectional structure of the display apparatus 100. FIG. 3 illustrates an abstracted sectional structure obtained by extracting a B-B cross-section in a display area A7 illustrated in FIG. 1, and each terminal part in a lead-out wiring area A8 for the wiring lines 2 for X position detection and the wiring lines 3 for Y position detection.

As illustrated in FIG. 3, in the touch panel layer 50, a low resistance conductive film 51 (first lower conductive film) is selectively formed in the display area A7 on a surface (first main surface) of the transparent substrate 27 formed of glass, PET, or the like, a low reflection film 52 (first low reflection film) is formed on the low resistance conductive film 51, and a transparent cap film 53 (first transparent film) is formed on the low reflection film 52. Then, a lower layer wiring line 15 (first laminated wiring line) is formed of a laminated structure obtained by laminating the low resistance conductive film 51, the low reflection film 52, and the transparent cap film 53 in this order.

A lower interlayer insulating film 54 (first interlayer insulating film) is formed so as to cover the lower layer wiring line 15. The lower layer wiring line 15 formed from the low resistance conductive film 51, the low reflection film 52, and the transparent cap film 53 in the display area A7, illustrated in FIG. 3, corresponds to the wiring line 2 for X position detection illustrated in FIG. 1. The transparent substrate 27 can be also said to be a base for forming the lower layer wiring line 15, and therefore is sometimes referred to as an underlayer.

Furthermore, a low resistance conductive film 61 (second lower conductive film) is selectively formed on the lower interlayer insulating film 54, a low reflection film 62 (second low reflection film) is formed on the low resistance conductive film 61, and a transparent cap film 63 (second transparent film) is formed on the low reflection film 62. Then, an upper layer wiring line 16 (second laminated wiring line) is formed of a laminated structure obtained by laminating the low resistance conductive film 61, the low reflection film 62, and the transparent cap film 63 in this order.

An upper interlayer insulating film 64 (second interlayer insulating film) is formed so as to cover the upper layer wiring line 16. This upper layer wiring line 16 corresponds to the wiring line 3 for Y position detection illustrated in FIG. 1. The lower interlayer insulating film 54 can be also said to be a base for forming the upper layer wiring line 16, and therefore is sometimes referred to as an underlayer.

On the other hand, in the lead-out wiring area A8, a contact hole 57 passing through the upper interlayer insulating film 64, the lower interlayer insulating film 54, the transparent cap film 53, and the low reflection film 52 to expose a surface of the low resistance conductive film 51 is formed, a protective conductive film 55 (first protective conductive film) is formed on a bottom surface and a side surface of the contact hole 57 including the surface of the low resistance conductive film 51, and a part of a surface of the upper interlayer insulating film 64. Then, a lower layer terminal part 17 (first external terminal part) for the lower layer wiring line 15 is formed of a laminated structure of the low resistance conductive film 51 and the protective conductive film 55.

Similarly, in the lead-out wiring area A8, a contact hole 67 passing through the upper interlayer insulating film 64, the transparent cap film 63, and the low reflection film 62 to expose a surface of the low resistance conductive film 61 is formed, a protective conductive film 65 (second protective conductive film) is formed on a bottom surface and a side surface of the contact hole 67 including the surface of the low resistance conductive film 61, and a part of a surface of the upper interlayer insulating film 64. Then, an upper layer terminal part 18 (second external terminal part) for the upper layer wiring line 16 is formed of a laminated structure of the low resistance conductive film 61 and the protective conductive film 65.

In FIG. 1, the lower layer terminal part 17 corresponds to the (connection) terminal part 5 extending from the lower layer wiring line 15 (=the wiring line 2 for X position detection) to be electrically connected through the lead-out wiring line 4, and the upper layer terminal part 18 corresponds to the terminal part 5 extending from the upper layer wiring line 16 the wiring line 3 for Y position detection) to be electrically connected through the lead-out wiring line 4.

The low resistance conductive film 51 for the lower layer wiring line 15 (lower layer terminal part 17) is formed of an Al based alloy that is a low resistance material, such as AlNiNd, and is formed with a thickness of, for example, 300 nm.

The low reflection film 52 for the lower layer wiring line 15 is formed of a aluminum nitride (AlN) film having a high degree of nitriding, for example, the degree of nitriding is 30 to 50 at % (atomic %) in a composition ratio of nitrogen. The low reflection film 52 is formed with a thickness of, for example, 50 nm.

The aluminum nitride film is appropriately selected in a condition where the degree of nitriding is 30 to 50 at % in the composition ratio of nitrogen, so that the reflectance of aluminum nitride film can be made to be 50% or less. For example, when the degree of nitriding is about 45 at % in the composition ratio of nitrogen, the reflectance can be made to be 30% or less. Additionally, when the thickness of the aluminum nitride film increases, the reflectance can be reduced, but it is technically difficult to accurately form the thickness. Therefore, as described above, the degree of nitriding is set, and the thickness is adjusted in accordance with the degree of nitriding, so that the optimum low reflection film 52 can be obtained.

The transparent cap film 53 for the lower layer wiring line 15 is formed of, for example, ITO (indium tin oxide), and is formed with a thickness of, for example, 50 nm.

The lower interlayer insulating film 54 is formed of, for example, $SiO_2$, and is formed with a thickness of, for example, 600 nm.

The low resistance conductive film 61 for the upper layer wiring line 16 (upper layer terminal part 18) is formed of an Al based alloy that is a low resistance material such as AlNiNd, and is formed with a thickness of, for example, 400 nm.

The low reflection film 62 for the upper layer wiring line 16 is formed of an aluminum nitride film whose degree of nitriding is high, for example, the degree of nitriding is 30 to 50 at % (atomic %) in the composition ratio of nitrogen. The low reflection film 62 is formed with a thickness of, for example, 50 nm.

As described above, the aluminum nitride film is appropriately selected in a condition where the degree of nitriding is 30 to 50 at % in the composition ratio of nitrogen, so that the reflectance of aluminum nitride film can be made to be 50% or less. For example, when the degree of nitriding is about 45 at % in the composition ratio of nitrogen, the reflectance can be made to be 30% or less. Additionally, the thickness is adjusted in accordance with the degree of nitriding, so that the optimum low reflection film can be obtained.

The transparent cap film 63 for the upper layer wiring line 16 is formed of, for example, ITO, and is formed with a thickness of, for example, 50 nm.

The upper interlayer insulating film 64 is formed of, for example, $SiO_2$, and is formed with a thickness of, for example, 300 nm.

In the lead-out wiring area A8, the protective conductive film 55 is formed on the bottom surface and the side surface of the contact hole 57, and the protective conductive film 65 is formed on the bottom surface and the side surface of the contact hole 67, as described above.

The protective conductive films 55 and 65 are formed of, for example, ITO, and each are formed with a thickness of, for example, 100 nm.

The color filter layer 40 is formed on a back surface (second main surface) of the transparent substrate 27, which is an opposite side to a formation surface of the touch panel layer 50. The color filter layer 40 is formed at such a position as to overlap with the display area A7 of the touch panel layer 50 in plan view (viewed in the XY plane surface in FIG. 1).

In the preferred embodiment, an example of the low reflection films 52 and 62 formed of AlN is described. However, the low reflection films 52 and 62 are not limited to this, and may be formed of metal (metal nitride) obtained by nitriding an Al based alloy composed mainly of Al and added with other metal. Examples of other metal include Fe, Co, and Ni of a group 8 transition metal, Nd of a rare-earth element, and the like.

In the preferred embodiment, an example of the protective conductive films 55 and 65 formed of ITO is described. However, the protective conductive films 55 and 65 are not limited to this, and IZO (indium zinc oxide), ITZO (indium tin zinc oxide), IGZO (indium gallium zinc oxide), or the like may be employed.

In the preferred embodiment described above, the wiring line length of the upper layer wiring line 16 that is the wiring line 3 for Y position detection formed to extend in the horizontal direction (X direction) of the horizontally long display area A7 is longer than the wiring line length of the lower layer wiring line 15 that is the wiring line 2 for X position detection formed to extend in the vertical direction (Y direction), and therefore the low resistance conductive film 61 has a larger thickness than the low resistance conductive film 51 because of reduction in wiring line resistance. However, the thicknesses of the low resistance conductive films 51 and 61 of the lower layer wiring line 15 and the upper layer wiring line 16 may be each simply arbitrarily determined depending on required resistance.

In the preferred embodiment, an example of the low resistance conductive films 51 and 61 formed of the Al based alloy is described. However, the low resistance conductive films 51 and 61 are not limited to this. For example, the low resistance conductive films 51 and 61 may be formed of Ag.

Thickness distribution on the set thicknesses of the low reflection films 52 and 62 in process completion is suppressed to nearly {minimum thickness/maximum thickness>0.6}, thereby producing an effect capable of reducing dispersion in reflection distribution.

The thicknesses of the lower interlayer insulating films 54 and 64 may be each simply arbitrarily determined by desired electrostatic capacitance or the like, or may be each determined by a selection ratio with a resist film during a dry etching process, and processing time, and the like. However, as the thickness increases, the differences in color and reflectance from the lower layer wiring line often reduce, and therefore the thickness is set to about 1 µm, and desirably set to 1.3 µm or more.

FIG. 4 to FIG. 24 are sectional views each illustrating a method for manufacturing the touch panel substrate 30 with a CF (touch panel structure) of the display apparatus 100 illustrated in FIG. 1 to FIG. 3. Hereinafter, the method for manufacturing the touch panel substrate 30 with a CF is described with reference to these drawings.

Figure 4:
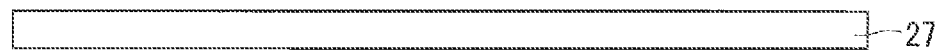
FIG. 4 is a sectional view illustrating a method for manufacturing a touch panel substrate with a CF in the display apparatus of the preferred embodiment of the present invention.
Figure 5:
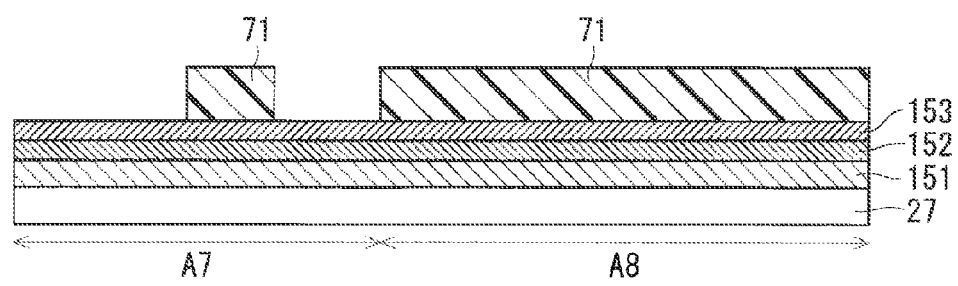

First, the transparent substrate 27 formed of glass, PET, or the like is prepared as illustrated in FIG. 4, and thereafter an AlNiNd film 151 is deposited with a thickness of 300 nm by using an AlNiNd target by a sputtering, as illustrated in FIG. 5. Then, an aluminum nitride alloy film 152 that is a metal nitride film whose degree of nitriding is high is deposited with a thickness of 50 nm on the AlNiNd film 151 in an atmosphere containing $N_2$ gas by using an AlNiNd target by sputtering with the same film deposition apparatus.

In a case where the degree of nitriding of the aluminum nitride alloy film 152 is low, the film becomes a reflection film, and a low reflection film cannot be formed. On the contrary, in a case where the degree of nitriding is high, the film becomes a transparent film, and does not become a low reflection film, and therefore relation between $N_2$ partial pressure and reflection characteristics by a film deposition apparatus to be used is desirably acquired in advance, and a film deposition condition is desirably determined such that a low reflection film having desired reflectance is obtained.

Furthermore, an amorphous ITO (indium tin oxide) film 153 is deposited with a thickness of 50 nm on the aluminum nitride alloy film 152 by sputtering, as illustrated in FIG. 5. Other method such as coating may be used in place of sputtering.

As illustrated in FIG. 5, after a resist material is coated on the ITO film 153, a pattern for the lower layer wiring line 15 is exposed, and patterned resist (mask) 71 for the lower layer wiring line 15 (and the lower layer terminal part 17 and the lead-out wiring line formed to be extended to lower layer terminal part 17) is formed by developing.

Figure 6:
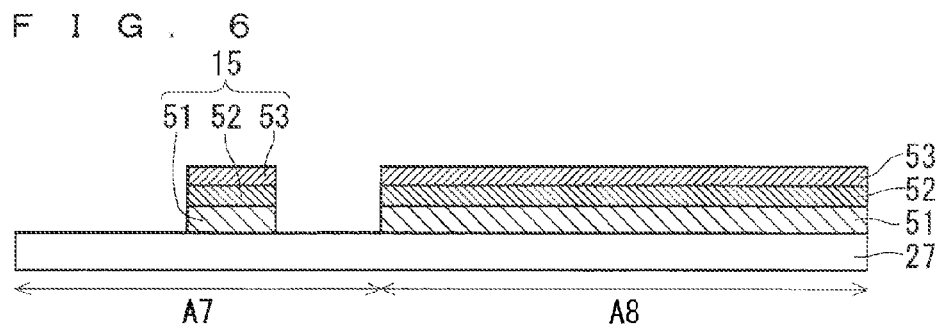

As illustrated in FIG. 6, the ITO film 153 is etched by using, for example, oxalic acid solution, by employing the patterned resist 71 as an etching mask, thereby obtaining a patterned transparent cap film 53. Then, the aluminum nitride alloy film 152 and the AlNiNd film 151 are etched by using, for example, mixed acid of phosphoric acid, nitric acid, and acetic acid, by employing the resist 71 and the transparent cap film 53 as etching masks, thereby obtaining a patterned low reflection film 52 and low resistance conductive film 51.

In a case where the aluminum nitride alloy film 152 and the AlNiNd film 151 are etched at the same time, the degree of nitriding of the aluminum nitride alloy film 152 is set in a range enabling etching by the above mixed acid.

The resist 71 is removed by using, for example, mixed liquid of monoethanolamine and dimethylsulfoxide, or the like, so that the lower layer wiring line 15 formed of the low resistance conductive film 51, the low reflection film 52, and the transparent cap film 53 is formed in the display area A7, and a structure of a preliminary stage for the lower layer terminal part 17 formed of the low resistance conductive film 51, the low reflection film 52, and the transparent cap film 53 is formed in the lead-out wiring area A8, as illustrated in FIG. 6.

Figure 7:
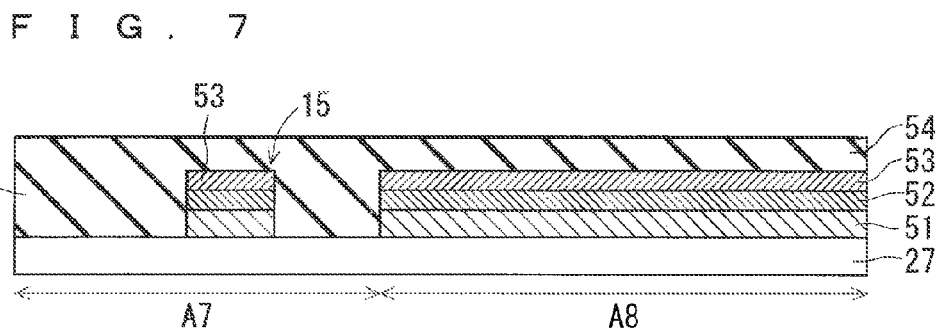

As illustrated in FIG. 7, an $SiO_2$ film is deposited to cover an overall surface including the lower layer wiring line 15 by, for example, CVD (chemical vapor deposition), thereby forming the lower interlayer insulating film 54 with a thickness of 600 nm.

Figure 8:
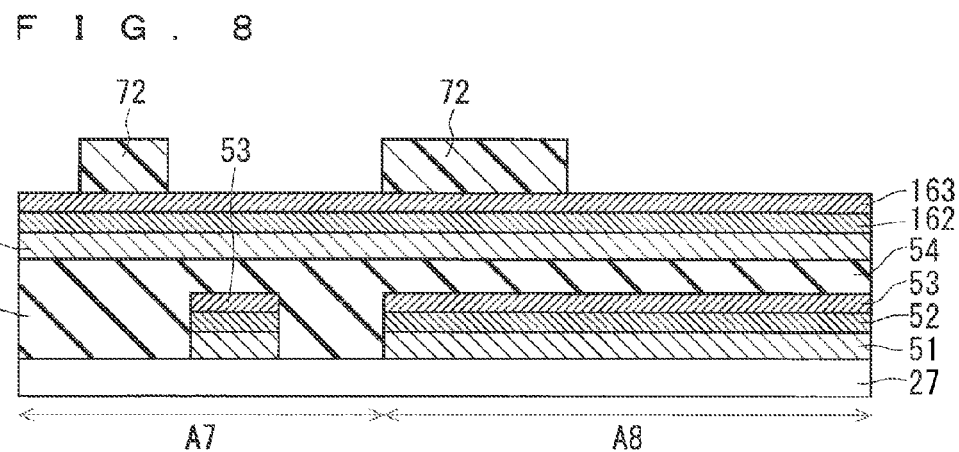

Then, the upper layer wiring line 16 is formed on the lower interlayer insulating film 54. First, similarly to the formation of the AlNiNd film 151, the aluminum nitride alloy film 152, and the ITO film 153, an AlNiNd film 161, an aluminum nitride alloy film 162 (metal nitride film), and an ITO film 163 are sequentially laminated, as illustrated in FIG. 8. Then, after a resist material is coated on the ITO film 163, a pattern for the upper layer wiring lines 16 (and the upper layer terminal part 18, and the lead-out wiring line formed to extend from the upper layer terminal part 18) is exposed, and patterned resist (mask) 72 for the upper layer wiring line 16 is formed by developing.

Figure 9:
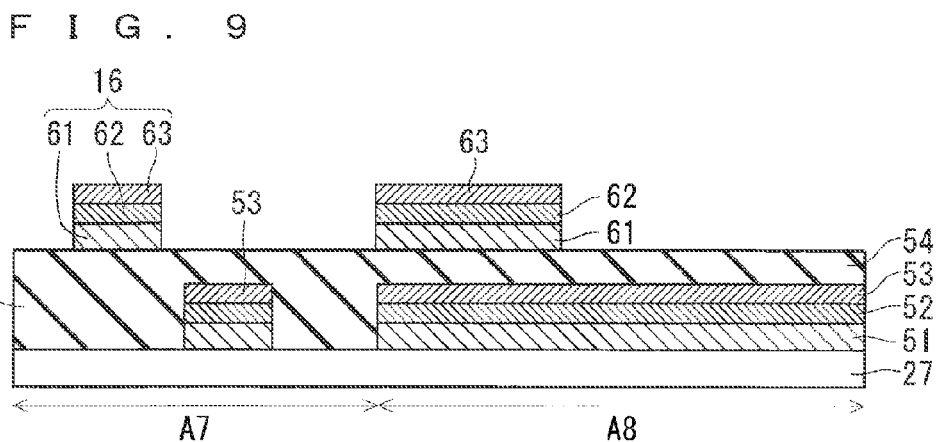

Similarly to the formation of the lower layer wiring line 15, the ITO film 163 is etched by employing the patterned resist 72 as an etching mask, thereby obtaining a patterned transparent cap film 63, as illustrated in FIG. 9. Then, the aluminum nitride alloy film 162 and the AlNiNd film 161 are etched by employing the resist 72 and the transparent cap film 63 as etching masks, thereby obtaining a patterned low reflection film 62 and a patterned low resistance conductive film 61. Thereafter, the resist 72 is removed similarly to the resist 71.

As a result, the upper layer wiring line 16 formed of the low resistance conductive film 61, the low reflection film 62, and the transparent cap film 63 are formed in the display area A7, and a structure of a preliminary stage for the lower layer terminal part 17 formed of the low resistance conductive film 61, the low reflection film 62, and the transparent cap film 63 is formed in the lead-out wiring area A8.

Figure 10:
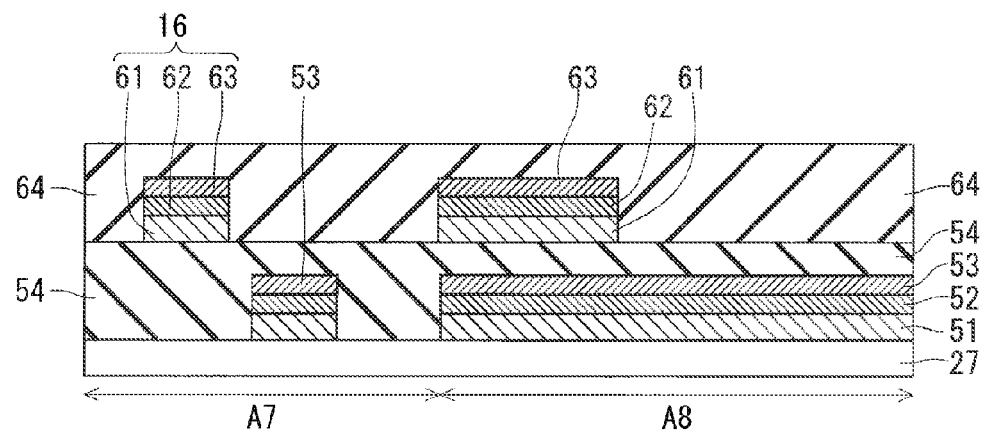

After the upper layer wiring line 16 is formed, an $SiO_2$ film is formed to cover an overall surface including the upper layer wiring lines 16 by, for example, CVD thereby forming the upper interlayer insulating film 64 with a thickness of 300 nm, as illustrated in FIG. 10.

Figure 11:
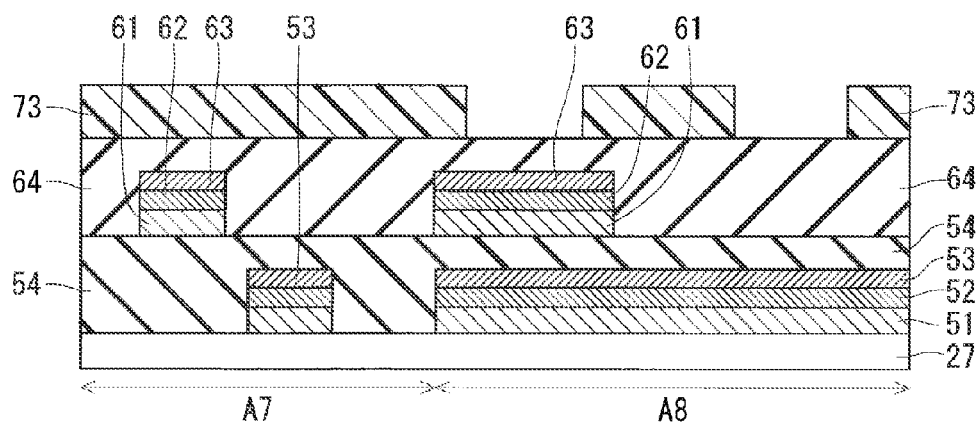

As illustrated in FIG. 11, after a resist material is coated on the upper interlayer insulating film 64, a pattern is exposed and developed in the lead-out wiring area A8 where the terminal part 5 (see FIG. 1) is formed, so that a patterned resist (mask) 73 for the lower layer terminal part 17 and the upper layer terminal part 18 is obtained.

Figure 12:
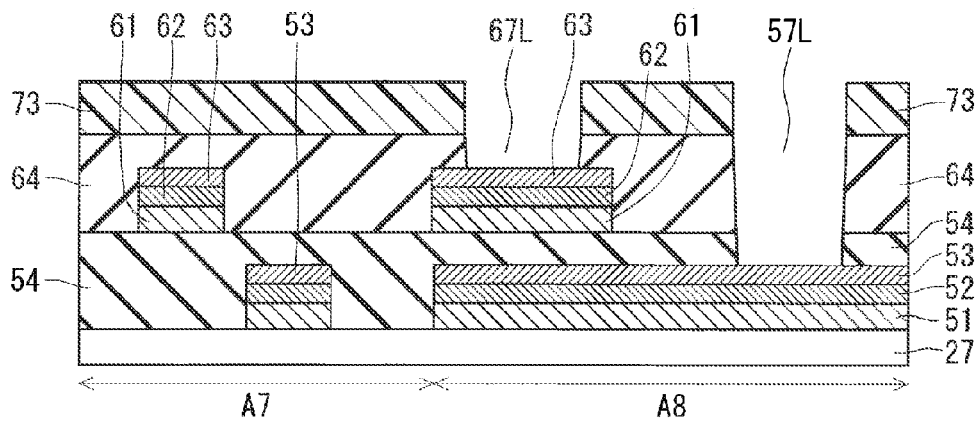

As illustrated in FIG. 12, the upper interlayer insulating film 64 and the lower interlayer insulating film 54 are etched by, for example, dry etching employing the resist 73 as an etching mask, so that the contact hole 67L passing through the upper interlayer insulating film 64 to expose a surface of the transparent cap film 63, and the contact hole 57L passing through the upper interlayer insulating film 64 and the lower interlayer insulating film 54 to expose a surface of the transparent cap film 53 are obtained in the lead-out wiring area A8.

Figure 13:
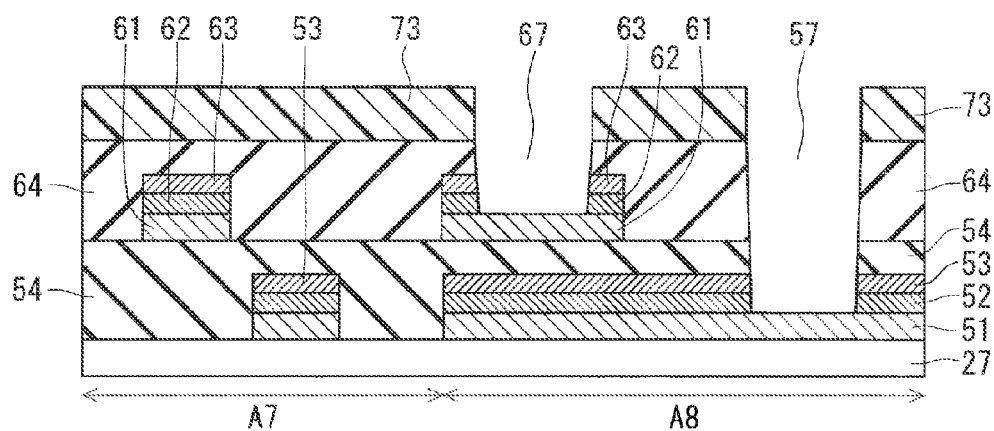

Thereafter, the transparent cap films 53 and 63 exposed in openings by the contact holes 57L and 67L are removed, and the low reflection films 52 and 62 exposed after the removal of the transparent cap films 53 and 63 are further removed, thereby obtaining openings formed of the contact holes 57 and 67 having shapes in which surfaces of the low resistance conductive films 51 and 61 are exposed, as illustrated in FIG. 13. Specifically, the ITO film is etched by using, for example, sulfuric acid based mixed acid, by employing the resist 73 as an etching mask, and the transparent cap films 53 and 63 are selectively removed to be patterned. Thereafter, the aluminum nitride alloy film is etched by using, for example, mixed acid of phosphoric acid, nitric acid, and acetic acid, by employing the resist 73, the upper interlayer insulating film 64, and the lower interlayer insulating film 54 as etching masks, thereby selectively removing and patterning the low reflection films 52 and 62. As a result, the contact holes 57 and 67 exposing the surfaces of the low resistance conductive film 51 and the low resistance conductive film 61 can be obtained in the lead-out wiring area A8.

Figure 14:
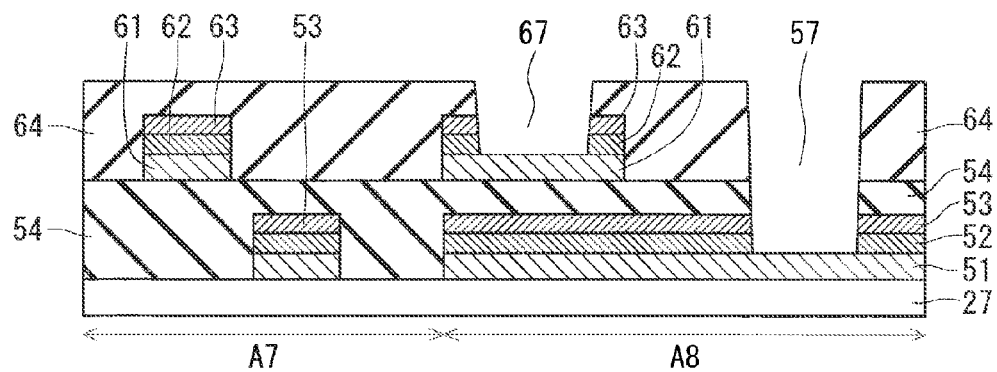

As illustrated in FIG. 14, the resist 73 is removed by using, for example, mixed liquid of monoethanolamine and dimethylsulfoxide, or the like, so that terminal openings of the contact holes 57 and 67 remain.

Furthermore, amorphous ITO (indium tin oxide) films are deposited on the surfaces of the low resistance conductive films 51 and 61 that are the bottom surfaces of the contact holes 57 and 67, the side surfaces of the contact holes 57 and 67, and a part of the upper interlayer insulating film 64 with a thickness of 100 nm by sputtering. Other method such as coating may be used in place of sputtering.

Furthermore, after a resist material is coated on the ITO film, a pattern of the protective conductive film is exposed, and patterned resist (mask) (not illustrated) for the protective conductive films 55 and 65 is obtained by developing.

The ITO film is etched by using, for example, oxalic acid solution, by employing the resist (not illustrated) for the patterned protective conductive films 55 and 56 as an etching mask, thereby obtaining patterned protective conductive films 55 and 65 corresponding to the inside of the contact holes 57 and 67.

Figure 15:
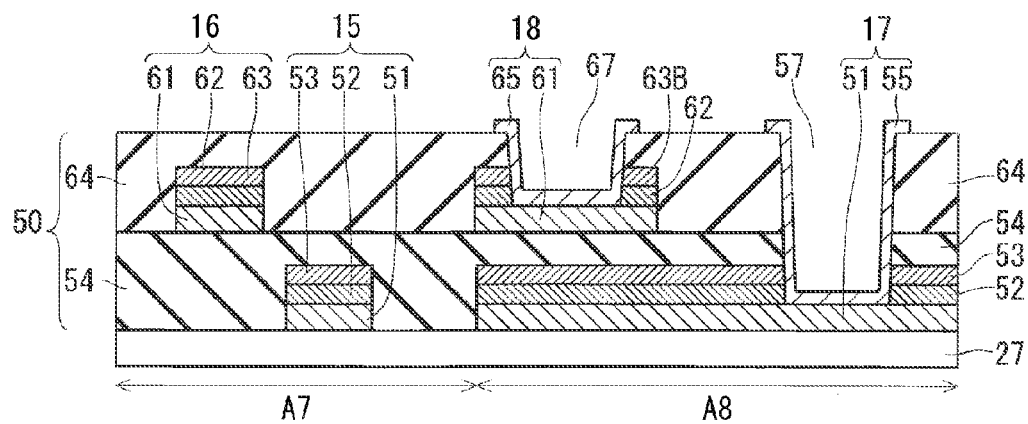
Figure 16:
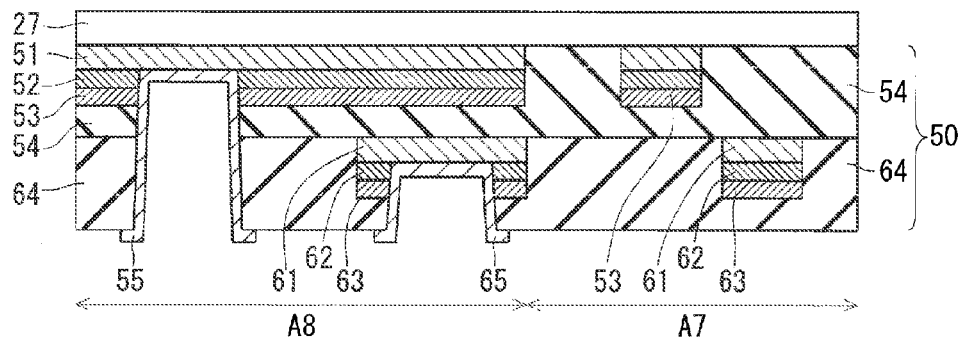

The resist (not illustrated) for the protective conductive films 55 and 56 are removed by using, for example, mixed liquid of monoethanolamine and dimethylsulfoxide, or the like. As a result, as illustrated in FIG. 15, the lower layer terminal part 17 formed of the low resistance conductive film 51 and the protective conductive film 55, and the upper layer terminal part 18 formed of the low resistance conductive film 61 and the protective conductive film 65 are obtained in the lead-out wiring area A8, thereby obtaining a final structure of the touch panel layer 50. Thereafter, the amorphous ITO film that is a constituent material of the protective conductive films 55 and 65 is crystallized by, for example, annealing at 230° C. for 50 minutes. Consequently, the resistance of ITO forming the protective conductive films 55 and 65 is reduced.

In the lead-out wiring area A8, when a process described later is performed, FPC (Flexible printed circuits) and the like are connected through the lower layer terminal part 17 (the protective conductive film 55 and the low resistance conductive film 51) and the upper layer terminal part 18 (the low resistance conductive film 61 and the protective conductive film 65), and therefore it is possible to implement highly reliable electric connection with low resistance.

Although description is omitted in the above description, as the transparent cap films 53 and 63 of the lower layer wiring line 15 and the upper layer wiring line 16, materials having higher refractive indexes than the lower interlayer insulating film 54 and the upper interlayer insulating film 64, for example, materials having refractive indexes of about 1.7 to 2.4 are selected, and the thicknesses are made to be 30 nm to 70 nm, so that optical path lengths L are set to be 0.05 to 0.17 μm, so that the reflectance of each laminated wiring line can be further reduced.

For example, in a case where an $SiO_2$ film is formed with a thickness of 1000 nm as the lower interlayer insulating film 54 (64) on a laminated film of the aluminum nitride alloy film 152 (162) and the AlNiNd film 151 (161), and is irradiated with standard illuminant D65, reflection brightness Y is 15.0. On the other hand, in a case where an IZO film having a refractive index of 1.68 to 2.10 and a thickness of 50 nm remains as the transparent cap film 53 (63) on the low reflection film 52 (62), reflection brightness Y is 6.7. The standard illuminant D65 is a light source used when the reflection brightness of a film is evaluated.

The example of a well-known film deposition method of aluminum nitride having low reflection includes sputtering using gas containing nitrogen. In a case of using the sputtering, reflectance can be set by a mixing ratio of nitrogen gas, or the like. However, as the mixing ratio of nitrogen gas increases, and the reflectance reduces, dispersion of the degree of nitriding of the in-plane of the low reflection film increases, and in-plane distribution of reflectance increases. Accordingly, in a case where the degree of nitriding of aluminum nitride of the low reflection film increase, there is a possibility that dispersion of the degree of nitriding of the in-plane of the low reflection film increases, and dispersion of reflectance also increases.

However, the lower layer wiring line 15 and the upper layer wiring line 16 are formed of laminated structures having the transparent cap films 53 and 63, so that the degrees of nitriding of the aluminum nitride films (the same applies in the aluminum nitride alloy films) forming the low reflection films 52 and 62 can be set low, and therefore the dispersion of the degree of nitriding of the in-plane of the low reflection films 52 and 62 is suppressed, and low reflection wiring lines having uniform reflectance can be implemented. Additionally, the degrees of nitriding of the low reflection films 52 and 62 can be set low, so that etching of the aluminum nitride films (the same applies in the aluminum nitride alloy films) is facilitated, and stable machining processes can be implemented.

Examples of materials of the transparent cap films 53 and 63 having refractive indexes of about 1.7 to 2.4 include transparent conductive films of IZO, ITO, SnO, ZnO, InO, and the like, transparent dielectric films of SiN, $Al_2O_3$, transparent AlN (composition ratio: 1:1), TaO, NbO, TiO, and the like.

In a case where the transparent cap films 53 and 63 are formed of materials that are difficult to selectively etch and remove the transparent cap films 53 and 63 with general etchant when etching in an opening process of forming the contact holes 57 and 67 in formation of the external terminal parts (the lower layer terminal part 17 and the upper layer terminal part 18), for example, crystallized ITO, or the like, a process of removing the transparent cap films 53 and 63 in the lead-out wiring area A8 before crystallization is desirably added. For example, in a case of the transparent cap film 53, a process of previously selectively removing a part to be removed as the contact hole 57 in the transparent cap film 53 is desirably added before the formation of the lower interlayer insulating film 54 illustrated in FIG. 7.

In the above manufacturing method, the transparent cap films 53 and 63 (films functioning as etching protective films) are formed of ITO films on the aluminum nitride alloy films forming the low reflection films 52 and 62, and therefore the aluminum nitride alloy films forming the low reflection films 52 and 62 are prevented from being directly exposed to alkaline resist peeling liquid when the resist is removed by the alkaline resist peeling liquid. Accordingly, the aluminum nitride alloy films forming the low reflection films 52 and 62 are etched by the resist peeling liquid, so that it is possible to prevent reduction in thicknesses and increase in reflectance, thereby lowering and vanishing of antireflection functions expected in the low reflection films 52 and 62. Therefore, it is possible to stably provide a touch panel that has a wiring pattern (pattern of the lower layer wiring lines 15 and the upper layer wiring lines 16) of low reflection keeping a designed reflectance range by the low reflection films 52 and 62, and is excellent in visibility of a display image even in outdoor use.

In the above description, the transparent cap films 53 and 63 are formed of amorphous ITO films. However, the present invention is not limited to this, and transparent cap films 53 and 63 formed of materials that do not damage the low reflection films 52 and 62 and the low resistance conductive films 51 and 61 in etching of the transparent cap films 53 and 63 may be selected. For example, in a case where amorphous IZO (Indium Zinc Oxide) is used as the transparent cap films 53 and 63, etching using oxalic acid based liquid is possible, and the low reflection films 52 and 62, and the low resistance conductive films 51 and 61 are not damaged.

In the above description, the etching of the aluminum nitride alloy films is performed by mixed acid of phosphoric acid, nitric acid, and acetic acid. However, the etching may be performed by using alkaline solution, or dry etching may be employed.

In a case where the aluminum nitride alloy films forming the low reflection films 52 and 62 are etched by solution incapable of etching the low resistance conductive films 51 and 61, the aluminum nitride alloy films can be formed with higher degrees of nitriding compared to a case of using the above mixed acid, and reflection can be further reduced.

In the above description, the manufacturing method by patterning the low reflection films 52 and 62, and the low resistance conductive films 51 and 61 by using the resist 73 and the transparent cap films 53 and 63 as resist masks is described. However, the manufacturing method is not limited to this. In a case where the transparent cap films 53 and 63 are formed of materials having high etching selectivity to the low reflection films 52 and 62, and the low resistance conductive films 51 and 61, the resist 73 may be removed after the patterning of the transparent cap films 53 and 63, and the low reflection films 52 and 62, and the low resistance conductive films 51 and 61 may be patterned by employing the patterned transparent cap films 53 and 63 as etching masks.

In a case where the transparent cap films 53 and 63 are formed of materials having high etching selectivity only to the low resistance conductive films, the resist mask may be removed after the patterning of the low reflection films 52 and 62, and the low reflection films 52 and 62 may be patterned by employing the patterned transparent cap films 53 and 63 as etching masks.

In the above preferred embodiment, the upper interlayer insulating film 64 and the lower interlayer insulating film 54 are formed of $SiO_2$. However, any insulating film having no problem in color of transmitted light in light transmitting parts other than the wiring line parts (the lower layer wiring line 15 and the upper layer wiring lines 16) may be employed. For example, a coating type SOG (spin on glass) film may be employed. The SOG film is used for the formation of the lower interlayer insulating film 54 and the upper interlayer insulating film 64, so that it is possible to reduce a possibility of generating disconnection at a place where the upper layer wiring lines 16 intersects with the lower layer wiring line 15. In this case, the upper interlayer insulating film 64 is formed to have a laminated structure of $SiO_2$, an SOG film, and the like, so that hardness of a part that becomes a lower surface in a color filter forming process increases, and therefore generation of a defect such as cracks is suppressed, which is more preferable.

Additionally, insulating films having no problem in color of transmitted light in light transmitting parts other than the wiring line parts may be used. For example, the coating type upper interlayer insulating film 64 and the coating type lower interlayer insulating film 54 may be formed of materials having photosensitivity. In this case, the formation of the openings of the contact holes 57 and 67 of the terminal parts can be replaced by this in coating, exposure, and developing, of a photosensitive interlayer insulating film, and a dry etching process and a resist peeling process using resist masks are unnecessary, and therefore a manufacturing process can be simplified, and an effect of suppressing a manufacturing cost is produced.

A method for manufacturing the color filter layer 40 is now described with reference to FIGS. 16 to 24. First, the structure illustrated in FIG. 15 is reversed, and the second main surface (hereinafter referred to as a "color filter formation surface") opposite to a touch panel formation surface that is a first surface of the transparent substrate 27 formed with the touch panel layer 50 is directed to the upper side.

Figure 17:
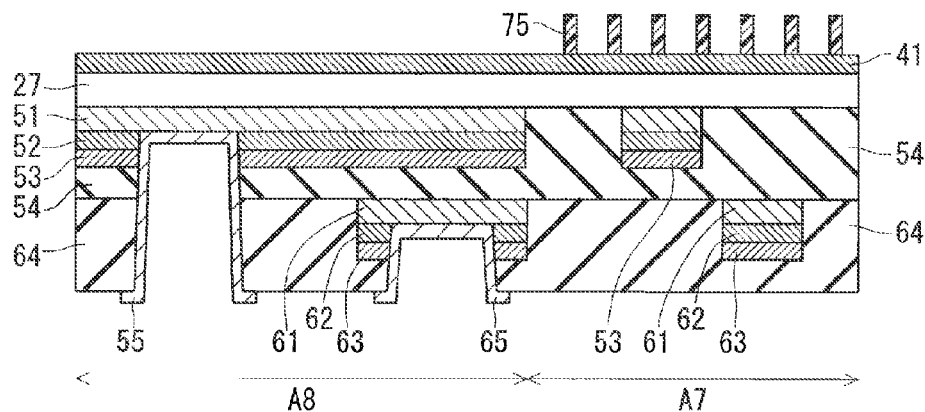

As illustrated in FIG. 17, in order to form a film for a black matrix layer 41K on a transparent substrate 27 that becomes the color filter formation surface, for example, a Cr film 41 is deposited with a thickness of 300 nm by using a Cr target by sputtering. After a resist material is coated on the Cr film 41 for a black matrix layer, a pattern of the black matrix is exposed to be developed, thereby forming patterned resist (mask) 75 for a black matrix.

At this time, alkaline developer is generally used in the developing of the resist 75. However, in the touch panel layer 50 of the preferred embodiment, the protective conductive films 55 and 65 are disposed in the openings by the contact holes 57 and 67 in the lead-out wiring area A8, and therefore even when materials such as aluminum are used as the low resistance conductive films 51 and 61 of the touch panel wiring lines (the lower layer wiring line 15 and the upper layer wiring line 16), and materials such as aluminum nitride are used as the low reflection films 52 and 62, it is possible to reliably avoid damage on these materials by alkaline developer.

In the preferred embodiment, when the color filter layer 40 is formed, the touch panel layer 50 is already formed on the touch panel formation surface (opposite surface of the color filter formation surface) of the transparent substrate 27. However, a surface of the touch panel layer 50 is formed with the lower interlayer insulating films 54 and 64 formed of materials having hardness such as $SiO_2$, and therefore it is possible to reduce failure such as damage on the touch panel layer 50 by a process of vacuum suction to a stage in exposure or the like performed in the formation of the color filter layer 40, or contact with an arm or the like during conveyance.

Figure 18:
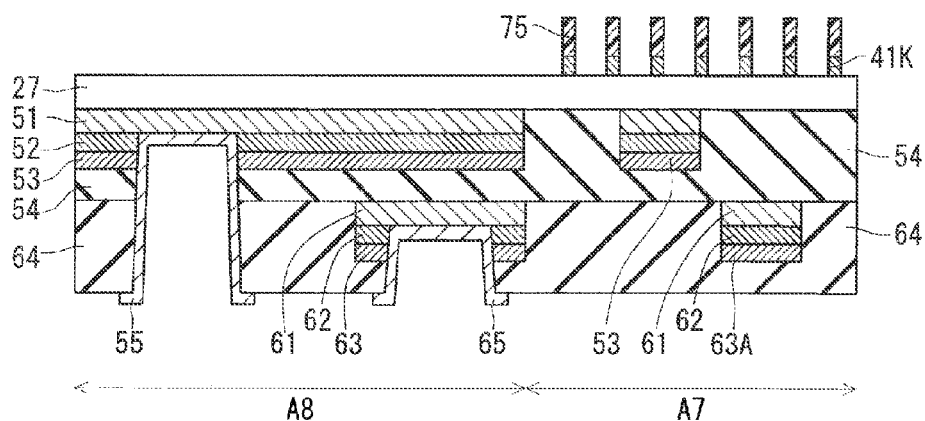

As illustrated in FIG. 18, the Cr film 41 is etched by using, for example, solution composed mainly of diammonium cerium (IV) nitrate, by employing the resist 75 as an etching mask, thereby obtaining a patterned black matrix layer 41K.

Figure 19:
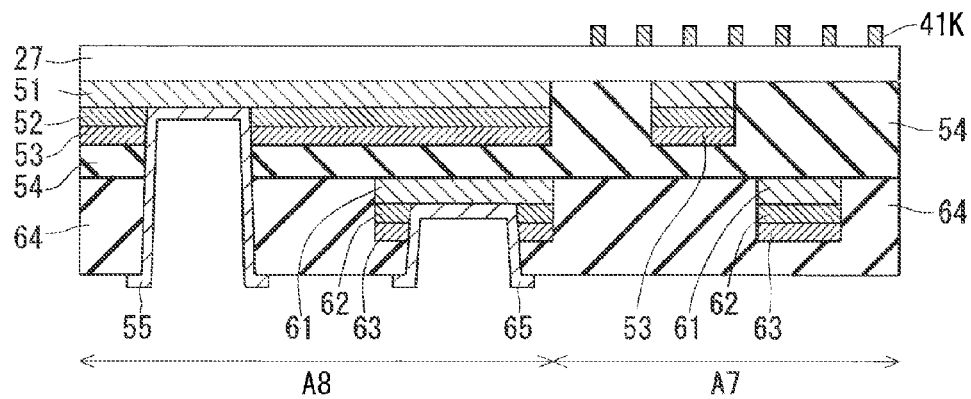

As illustrated in FIG. 19, the resist 75 is removed by using, for example, mixed liquid of monoethanolamine and dimethylsulfoxide, or the like, thereby completing the black matrix layer 41K.

At this time, the mixed liquid of monoethanolamine and dimethylsulfoxide is generally used for peeling of the resist 75. However, in the touch panel layer 50 of the preferred embodiment, the protective conductive films 55 and 65 are disposed in the openings by the contact holes 57 and 67 in the lead-out wiring area A8. Therefore, even when materials such as aluminum are used as the low resistance conductive films 51 and 61 of the touch panel wiring lines (the lower layer wiring line 15 and the upper layer wiring line 16), and materials such as aluminum nitride are used as the low reflection films 52 and 62, it is possible to reliably avoid damage by peeling liquid.

Figure 20:
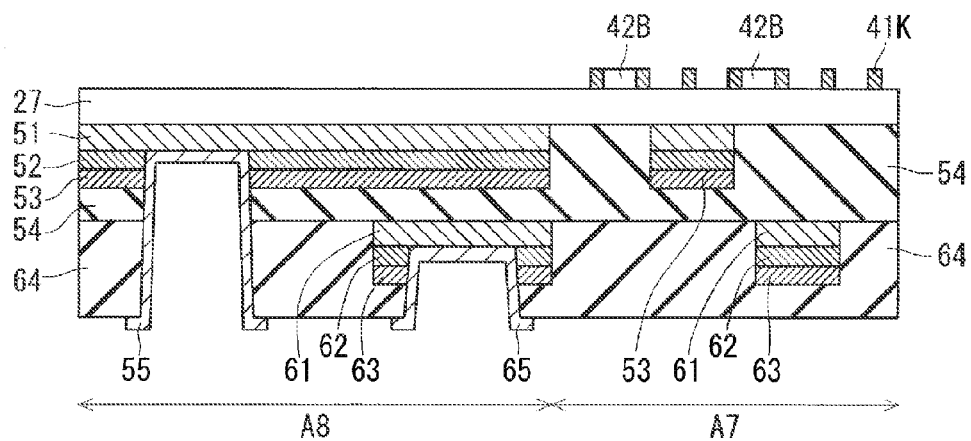

As illustrated in FIG. 20, a coloring material, for example, a photosensitive blue coloring material is coated, exposed by using an exposure mask of a blue pixel pattern, and developed, so that coloring material parts 42B that are the blue pixel pattern are formed. At this time, in order to prevent light leakage, the coloring material parts 42B are formed so as to overlap with the black matrix layer 41K in a proper range.

Figure 21:
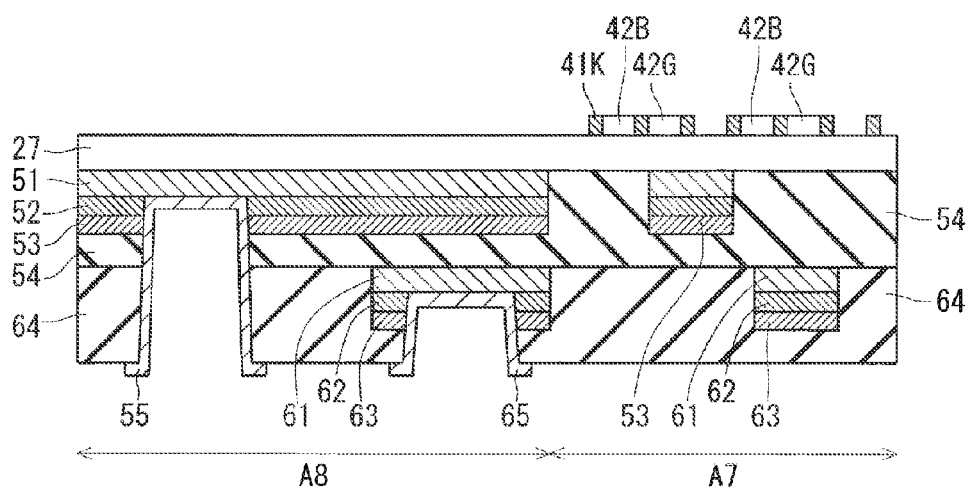

Thereafter, similarly to the formation of the coloring material parts 42B, coloring material parts 42G and coloring material parts 42R that are green and red pixel patterns are formed as illustrated in FIGS. 21 and 22.

Thereafter, an overcoat layer 43 is formed to cover the black matrix layer 41K, and the coloring material parts 42R, 42G and 42B, thereby completing the color filter layer 40, as illustrated in FIG. 23. At this time, the color filter layer 40 is formed in an area where the color filter layer 40 overlaps with the display area A7 of the touch panel layer 50 in plan view. The formation of the overcoat layer 43 may be omitted as necessary.

Although an example of the formation process of the color filter layer 40 is thus described, a color filter layer other than the color filter layer 40 formed in the above process may be formed. For example, the color filter layer may not be the color filter layer formed of the coloring material, but may be a color filter layer that develops color by interference color. The black matrix layer 41K is a metal film in the above formation method of the color filter layer 40, but may be formed by using a resin black matrix material as the black matrix material.

Figure 24:
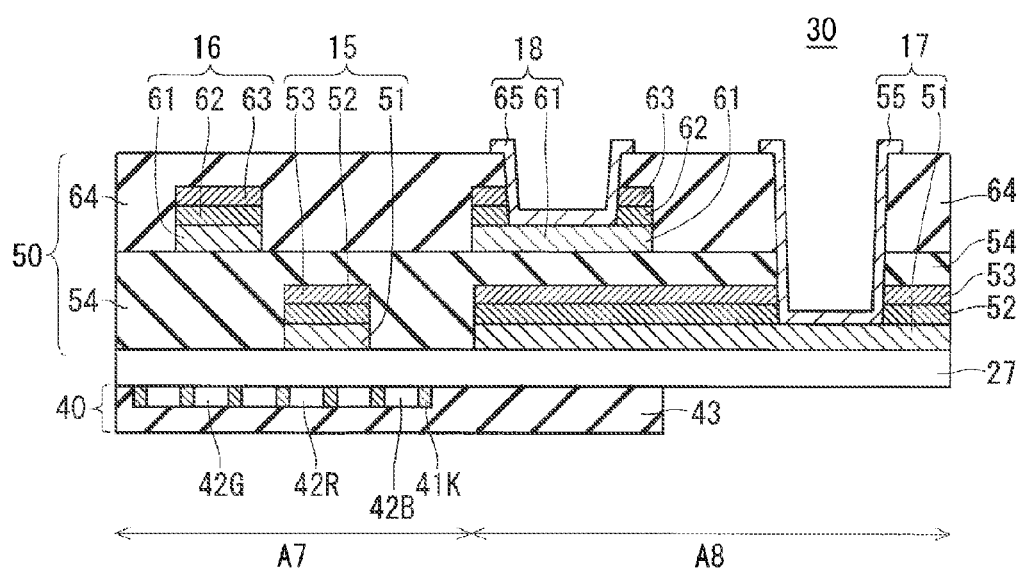

As a result, as illustrated in FIG. 24, the touch panel substrate 30 with a CF, in which the touch panel layer 50 is formed on the surface of the transparent substrate 27 (touch panel formation surface), and the color filter layer 40 is formed on the back surface of the transparent substrate 27 (color filter formation surface), is completed.

That is, the touch panel substrate 30 with a CF, in which the touch panel layer 50 and the color filter layer 40 are integrally formed on the surface and the back surface of the transparent substrate 27, is completed as a facing substrate of the TFT substrate 20.

Although illustration in FIGS. 4 to 24 is omitted, a transparent conductive film of ITO or the like, a gap adjustment columnar spacer for liquid crystal cells, and the like are disposed as necessary in order to form the touch panel substrate 30 with a CF.

Thus, in the touch panel substrate 30 with a CF (touch panel structure) of the preferred embodiment, the protective conductive films 55 (65) are formed on the bottom surfaces and the side surfaces including the low resistance conductive films 51 (61) in the openings by the contact holes 57 and 67 of the touch panel layer 50. Therefore, even when the color filter layer 40 is manufactured after the formation of the touch panel layer 50, the low resistance conductive films 51 (61) and the low reflection films 52 (62) in the lead-out wiring area A8 are not influenced.

As a result, the low resistance conductive films 51 (61) can be formed by using a material such as aluminum having low resistance, and the low reflection films 52 (62) can be formed by using a material having low reflectance, and therefore it is possible to obtain the touch panel substrate 30 with a CF, in which the touch panel layer 50 formed of the lower layer wiring lines 15 and the upper layer wiring lines 16 (laminated wiring lines) having low resistance and low reflection is formed without degrading performance.

In addition, in the touch panel substrate 30 with a CF of the preferred embodiment, the protective conductive films 55 and 65 are formed as components of the lower layer terminal parts 17 and the upper layer terminal parts 18 (terminal parts 5) electrically connected to the lower layer wiring lines 15 (wiring lines 2 for X position detection) and the upper layer wiring lines 16 (wiring lines 3 for Y position detection) through the lead-out wiring lines 4. Therefore, in the touch panel substrate 30 with a CF, the matrix wiring lines formed of the lower layer wiring lines 15 and the upper layer wiring lines 16 which are essential when a touch sensor function is implemented can be formed with low resistance and low reflection.

Furthermore, as described above, the protective conductive films 55 (65) are formed as the components of the lower layer terminal parts 17 and the upper layer terminal parts 18 on the low resistance conductive films 51 (61) (lower conductive films), and therefore, during the manufacturing processes of the lower layer wiring lines 15 and the upper layer wiring lines 16 illustrated in FIGS. 5 to 9, the materials such as aluminum having low resistance can be selected as the low resistance conductive films 51 (61), and the materials having low reflectance can be selected as the low reflection films 52 (62). Accordingly, it is possible to finally obtain the touch panel substrate 30 with a CF, in which the low resistance conductive films 51 and 61 (laminated wiring lines) having low resistance, and the touch panel layer 50 formed of the low reflection films 52 and 62 having low reflectance are formed without degrading performance.

Thereafter, the touch panel substrate 30 with a CF is bonded with the TFT substrate 20 by a seal material through a cell assembly process, and the liquid crystal part 35 formed of a liquid crystal material and the seal material 36 are disposed in a space between the touch panel substrate 30 with a CF and the TFT substrate 20, thereby forming the liquid crystal display apparatus 100 integrated with a touch panel.

Thereafter, the polarizing plate 66, and the like are disposed on the surface of the touch panel layer 50, and the TFT substrate 20. In addition, in the lead-out wiring area A8 of the touch panel layer 50, an FPC, a control substrate, and the like are electrically connected through the lower layer terminal parts 17 and the upper layer terminal parts 18 formed of the low resistance conductive films 51 and 61, and the protective conductive films 55 and 65, and therefore it is possible to implement highly reliable electric connection with low resistance.

Thereafter, the touch panel substrate 30 with a CF, the liquid crystal part 35, the TFT substrate 20, and the like are housed in the housing 14 along with the backlight unit 21, thereby completing the display apparatus 100 of the preferred embodiment, illustrated in FIGS. 2 and 3.

Thus, the display apparatus 100 of the preferred embodiment can be manufactured by performing the step of forming the touch panel substrate 30 with a CF, and the step of forming a structure other than the touch panel substrate 30 with a CF including the liquid crystal part 35 and the TFT substrate 20 being a driving unit thereof, such that the side of the lower interlayer insulating films 54 and 64 in the display area A7 are display observation surface.

Accordingly, it is possible to obtain the display apparatus 100 having the touch panel substrate 30 with a CF, in which the touch panel layer 50 formed of the lower layer wiring lines 15 and the upper layer wiring lines 16 that are the laminated wiring lines having low resistance and low reflectance performance are formed without degrading performance.

In the preferred embodiment, by the so-called touch panel substrate 30 with a CF for on-cell, in which the touch panel layer 50 and the color filter layer 40 are formed on the surface and the back surface of the same transparent substrate 27, the low resistance wiring structure by the low resistance conductive films 51 (61) of Al or the like can be implemented with high yield efficiency, and the module thickness of the overall apparatus can be reduced. Therefore the display apparatus 100, in which the touch panel substrate 30 with a CF is housed in the housing 14 along with the TFT substrate 20 and the like, can exert function improvement by thickness reduction and weight reduction, and a cost reduction effect by simplification of the structure.

When protective plate glass is bonded on an uppermost layer on the display surface side (observer side) by an adhesive material in order to impart strength, durability is improved.

The low resistance wiring lines by the low resistance conductive films 51 and 61, the low reflection films 52 and 62, and the transparent cap films 53 and 63 are applied to the wiring lines (lower layer wiring lines 15 and the upper layer wiring lines 16) of the touch panel layer 50 in the above-described preferred embodiment, but may be applied to wiring lines of a liquid crystal display that is the display apparatus 100, or may be applied to light shielding layer that reduces reflection of the display surface side of the liquid crystal display.

While the invention has been shown and described in detail, the foregoing description is in all aspects illustrative and not restrictive. It is therefore understood that numerous modifications and variations can be devised without departing from the scope of the invention.

What is claimed is:

1. A touch panel structure comprising:
   a substrate having a first main surface and a second main surface;
   a touch panel layer formed on the first main surface of said substrate, and having a display area, and a lead-out wiring area where an external terminal part for external connection is provided; and
   a color filter layer formed on the second main surface of said substrate, said color filter layer being formed to overlap with said display area of said touch panel layer in plan view, wherein
   said touch panel layer includes a laminated wiring line formed by laminating a lower conductive film, a low reflection film, and a transparent film in this order,
   said touch panel layer further includes:
      an interlayer insulating film formed to cover said laminated wiring line;
      an opening selectively formed in said lead-out wiring area, passing through said interlayer insulating film, said transparent film, and said low reflection film, and having a bottom surface that is an exposed surface of said lower conductive film; and
      a protective conductive film formed on the bottom surface including said lower conductive film and a side surface of said opening, and
   said lower conductive film and said protective conductive film function as said external terminal part.

2. The touch panel structure according to claim 1, wherein said transparent film has a higher refractive index than said interlayer insulating film.

3. The touch panel structure according to claim 1, wherein said transparent film is formed of a material having a refractive index of 1.7 to 2.4, and a thickness is set to 30 to 70 nm.

4. The touch panel structure according to claim 1, wherein a thickness of said low reflection film is set such that a ratio of a minimum thickness to a maximum thickness (minimum thickness/maximum thickness) exceeds 0.6.

5. The touch panel structure according to claim 1, wherein said low reflection film is formed of a metal nitride film composed mainly of aluminum, and
   a degree of nitriding is 30 to 50 at % in a composition ratio of nitrogen.

6. The touch panel structure according to claim 1, wherein said laminated wiring line includes a first laminated wiring line formed to extend in a first direction, and a second laminated wiring line extending in a second direction intersecting with said first direction in plan view, and formed above said first laminated wiring line,
   said external terminal part includes first and second external terminal parts formed in the same layer as said first and second laminated wiring lines,
   said lower conductive film includes first and second lower conductive films, said low reflection film includes first and second low reflection films, said transparent film includes first and second transparent films, and said protective conductive film includes first and second protective conductive films, said first laminated wiring line is formed by laminating said first lower conductive film, said first low reflection film, and said first transparent film in this order, said second laminated wiring line is formed by laminating said second lower conductive film, said second low reflection film, and said second transparent film in this order, said first external terminal part is formed of said first lower conductive film, and said first protective conductive film, and said second external terminal part is formed of said second lower conductive film, and said second protective conductive film, and said interlayer insulating film includes a first interlayer insulating film formed to cover said first laminated wiring line, and a second interlayer insulating film formed to cover said second laminated wiring line, and said second laminated wiring line is formed on said first interlayer insulating film.

7. The touch panel structure according to claim 1, wherein a side of said interlayer insulating film in said display area is a display observation surface of a display apparatus.

8. A method for manufacturing a touch panel structure comprising the steps of:
(a) preparing a substrate having a first main surface and a second main surface;
(b) forming a touch panel layer on the first main surface of said substrate, the touch panel layer having a display area, and a lead-out wiring area where an external terminal part for external connection is provided; and
(c) forming a color filter layer on the second main surface of said substrate after performing said step (b), said color filter layer being formed to overlap with said display area of said touch panel layer in plan view, wherein
said step (b) includes the steps of:
(b-1) forming a laminated wiring line on said substrate, the laminated wiring line being formed by laminating a lower conductive film, a low reflection film, and a transparent film in this order;
(b-2) forming an interlayer insulating film to cover said laminated wiring line;
(b-3) selectively forming an opening in said lead-out wiring area, the opening passing through said interlayer insulating film, said transparent film, and said low reflection film, and having a bottom surface that is an exposed surface of said lower conductive film; and
(b-4) forming a protective conductive film on the bottom surface including said lower conductive film and a side surface of said opening, and
said lower conductive film and said protective conductive film in said lead-out wiring area function as said external terminal part.

9. The method for manufacturing a touch panel structure according to claim 8, wherein
said transparent film has a higher refractive index than said interlayer insulating film.

10. The method for manufacturing a touch panel structure according to claim 8, wherein
said transparent film is formed of a material having a refractive index of 1.7 to 2.4, and a thickness is set to 30 to 70 nm.

11. The method for manufacturing a touch panel structure according to claim 8, wherein
a thickness of said low reflection film is set such that a ratio of a minimum thickness to a maximum thickness (minimum thickness/maximum thickness) exceeds 0.6.

12. The method for manufacturing a touch panel structure according to claim 8, wherein
said low reflection film is formed of a metal nitride film composed mainly of aluminum, and
a degree of nitriding is 30 to 50 at % in a composition ratio of nitrogen.

13. A method for manufacturing a display apparatus comprising the steps of:
manufacturing a touch panel structure by:
(a) preparing a substrate having a first main surface and a second main surface;
(b) forming a touch panel layer on the first main surface of said substrate, the touch panel layer having a display area, and a lead-out wiring area where an external terminal part for external connection is provided; and
(c) forming a color filter layer on the second main surface of said substrate after performing said step (b), said color filter layer being formed to overlap with said display area of said touch panel layer in plan view, wherein
said step (b) includes the steps of:
(b-1) forming a laminated wiring line on said substrate, the laminated wiring line being formed by laminating a lower conductive film, a low reflection film, and a transparent film in this order;
(b-2) forming an interlayer insulating film to cover said laminated wiring line;
(b-3) selectively forming an opening in said lead-out wiring area, the opening passing through said interlayer insulating film, said transparent film, and said low reflection film, and having a bottom surface that is an exposed surface of said lower conductive film; and
(b-4) forming a protective conductive film on the bottom surface including said lower conductive film and a side surface of said opening, and
said lower conductive film and said protective conductive film in said lead-out wiring area function as said external terminal part; and
forming a structure other than said touch panel structure, including a liquid crystal part and a drive unit such that a side of said interlayer insulating film in said display area is a display observation surface.

* * * * *